(No Model.)
F. E. MONTANUS.
COOKING UTENSIL.
No. 507,828. Patented Oct. 31, 1893.
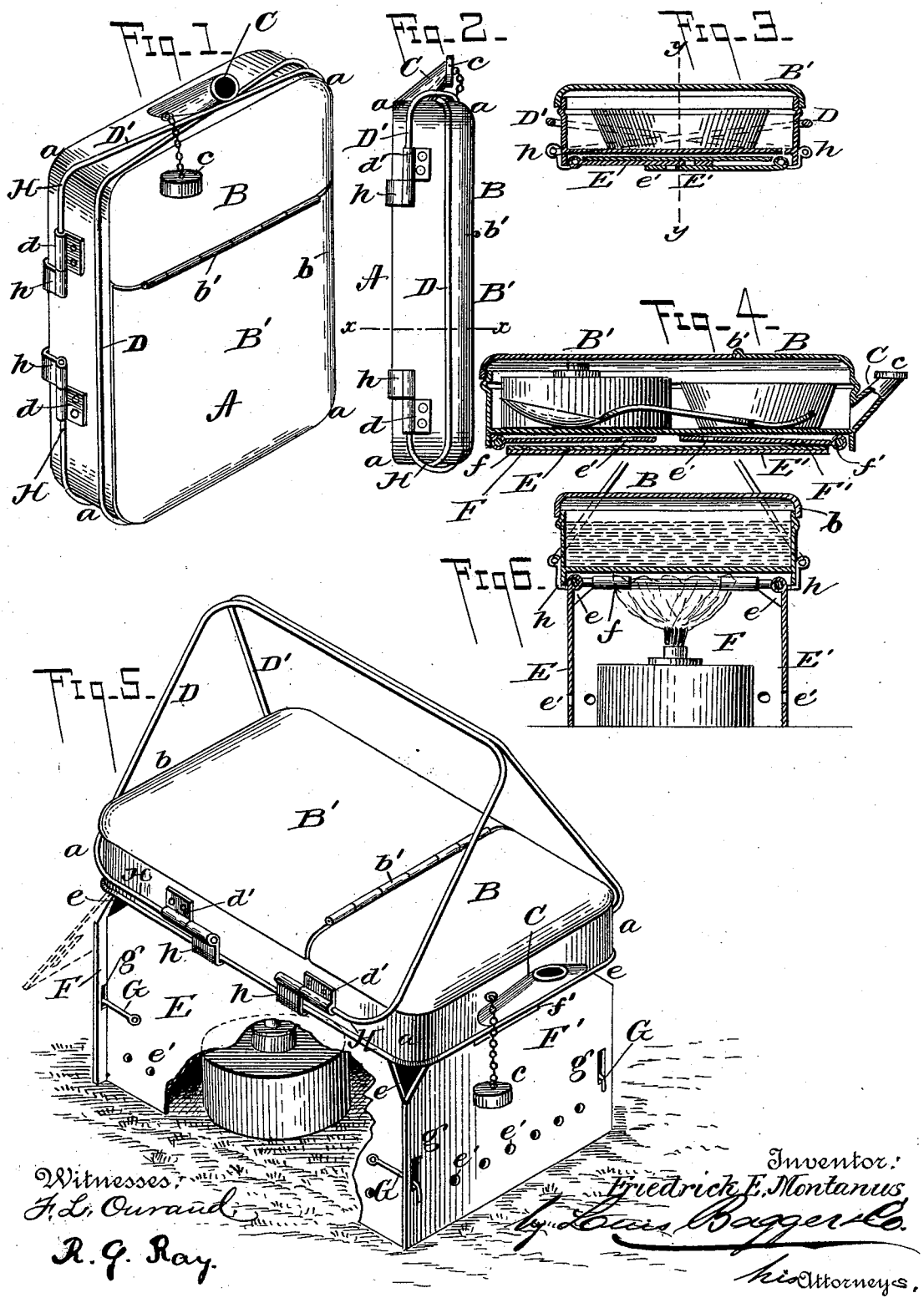

UNITED STATES PATENT OFFICE.

FRIEDRICK ELI MONTANUS, OF WASHINGTON, DISTRICT OF COLUMBIA.

COOKING UTENSIL.

SPECIFICATION forming part of Letters Patent No. 507,828, dated October 31, 1893.

Application filed February 24, 1893. Serial No. 463,566. (No model.)

*To all whom it may concern:*

Be it known that I, FRIEDRICK ELI MONTANUS, a citizen of the United States, and a resident of Washington, in the District of Columbia, have invented certain new and useful Improvements in Cooking Utensils; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved cooking utensil, showing the same as it appears when folded up and not in use, but ready to be put into the pocket or satchel. Fig. 2 is a side view of the same. Fig. 3 is a transverse sectional view on line $x$—$x$ in Fig. 2. Fig. 4 is a longitudinal sectional view on line $y$—$y$ in Fig. 3. Fig. 5 is a perspective view, showing the apparatus opened up and placed in operative position ready for use; one of the side-plates being broken away in part, to show the interior of the stove or heating-chamber; and Fig. 6 is a transverse sectional view on a vertical plane through the apparatus in its working position.

Like letters of reference denote corresponding parts in all the figures.

This invention relates to portable devices for cooking and culinary purposes, and has for its object to provide a portable apparatus especially adapted to the wants of travelers, tourists and excursionists, for making coffee, tea, or boiling water for culinary and other purposes, which is in the nature of a combined coffee-pot or cooking vessel, and stove or heater, that can be folded up when not in use, so that it may be carried conveniently in the pocket, satchel or traveling bag, and can be made instantly available and ready for use by any person, even a child, when desired.

Referring to the accompanying drawings, the letter A denotes the boiler of my apparatus, which, unlike an ordinary coffee-pot or kettle, is of a flat rectangular shape, having, for convenience when carried in the pocket, rounded corners, $a$, and a beveled or rounded top rim $b$. About one third part of the top plate or cover B is fastened solid to the flat body A, while the other part B', covering about two thirds is hinged at $b'$ to the fixed part B, forming a lid or cover through which the shallow vessel A may be filled with water, milk, prepared soup, or anything else, whether fluid or solid in its nature, that it is desired to boil or heat. By making the hinged cover B' large, and hinging it in the manner shown, solid or semi-solid articles of food, such as oysters, cutlets, eggs, or small fruit and vegetables, may be placed into the receptacle A for cooking or heating.

At the closed end of the flat receptacle is a short spout C, preferably covered with a cap $c$, attached to the device by a short chain; and fastened to the sides by hinges $d\ d'$, are two wire bails, D and D', which when opened out form handles for holding and manipulating the apparatus when in use. One of these bails, D', is slightly larger than the other, so that in folding down the handles over the flat top, as shown in Figs. 1 to 4, one will overlap the other and both bails will lie down even and flat across the top or upper side of the apparatus. The side hinges $d$ and $d'$ also serve as hinges for the side plates E and E', which are flat plates of tin or other suitable sheet metal, cut away at their upper corners to form upper air vents, $e$, one in each corner, in addition to which each of the plates E E' has a row of apertures, $e'$, near the lower edge, forming air inlets, the function of which is to supply the chamber formed by the folding sides and ends with air when the lamp is burning. At each end of the receptacle A is also hinged (upon hinges $f$ and $f'$) a plate F and F', in all respects similar to the side plates E and E', and, like these, provided with a row of bottom holes, or air inlets $e'$, and cut off obliquely at the upper corners to form, in conjunction with the similarly cut off side plates, the upper air-ducts or corner vents $e$. When in their extended or opened-up position, the hinged side and end plates are locked together at the corners by small wire hooks G, hooked into slots $g$; or any other suitable simple and easily manipulated fastening device may be substituted for the hooks and slots.

I prefer to construct the bail hinges $d$ and side-plate hinges $h$ in such a manner that the bent ends of the bails will answer the purposes of a pin or pintle for both. To this end, the ends of the wire handle-bails D and D' are bent at right angles, as shown at H, and inserted through the hinge-sleeves $d$, the bent parts or elbows H being sufficiently long to project some distance on the other side of said sleeves so as to enter the hinge-sleeves $h\,h$ appertaining to the side plates E and E'; the hinge-sleeves $d$ being formed in the usual way by bending or rolling a small strip of sheet-metal into the form of a tube or sleeve and fastening it by soldering or riveting its flap or leaf upon the sides of the receptacle A, the proper distance apart. The hinge-sleeves $h$ appertaining to the side plates (as well as those of the end plates) are preferably made in one piece or integral with the plates themselves by leaving sufficient metal in cutting out the same from the flat metal blanks, and are then rolled to form sleeves or tubes for the insertion of the free ends of the elbows H, which thus form the pintles for both hinges $d$ and $h$. By spreading apart the sides of the bail, the hinge elbows H H may readily be withdrawn from the hinges $h\,h$ of the side plates, so that the latter can be detached from the vessel A whenever desired.

When the side plates and end plates are folded down flat against the bottom, and the bails or handles folded down upon each other across the top, as shown in the first four figures on the drawings, the whole apparatus can be easily carried in the pocket, or in a small satchel or traveling bag. Inside of the receptacle I place an alcohol or other suitable lamp L, a folding cup K, a small flask for oil or alcohol, a couple of spoons, and any other implements which it may be desired to carry along and for which there is room. When the apparatus is to be used, these articles are taken out, the vessel A is filled with water or whatever else it may be desired to boil or heat, the handles are spread out, so that the vessel can be carried and handled without burning the fingers, and the side and end plates are folded out at right angles to the bottom and hooked together in the corners. The lamp, after having had its wick saturated with alcohol, is then lighted and placed within the heating-chamber or stove J formed by the side and end plates; and, if desired, either one of the end plates may be unhooked at the corners and lifted, as indicated in dotted lines in Fig. 5, to increase the air supply to the lamp. When this is done, the apparatus (if used in the open air) should be so placed that its closed end will face the wind and the open end be on the lee side. In windy or rainy weather, it may be necessary or desirable to close all the sides; but in that event a sufficient supply of air for combustion will always enter the stove chamber through the bottom apertures $e'$, which encircle the closed chamber on all sides, while the products of combustion will pass off through the upper corner apertures $e$. By making the lamp high enough so as to bring its wick close to the flat bottom of the boiler or receptacle A, the flame will spread evenly over the entire area of the bottom, so that the contents of the vessel will soon reach the boiling point.

The folding side plates E E' and the end plates F F', besides forming the sides and ends for the stove or heating chamber when the apparatus is in use, have another important function, viz: when folded down flat against the bottom, they form a shield or guard for the same, covering its soot and blackened surface so that it cannot soil the pocket or other receptacle in which the apparatus is carried. If desired, the whole device, when folded, may be placed within a shallow seamless metal box with a flat removable top, so that the top and bottom of this outside box or case may be used as pans for cooking or frying, or as plates to eat from.

It is desirable that the fixed top part B of the flat boiler or vessel A should extend only about one-third the length of the vessel, the remaining two thirds being covered by the hinged lid B'. This is for the reason that this construction will permit of the easy insertion of the fingers and cleaning-cloth so as to reach all the way to the end of the vessel, so that the same may be cleaned out thoroughly and effectually after use. If a larger part of the vessel were closed with a rigid or immovable cover, it would be difficult to get access to all of the interior, especially the corners, which are made rounded for the double purpose of facilitating their thorough cleaning inside and out, as well as to prevent the outside corners from catching into the lining of the pocket when the apparatus is carried in one. Sharp metal corners would be objectionable on these grounds, and I always construct the vessel A with rounded corners $a$ and a rounded or beveled edge $b$. By cutting off the corners of the folding side and end plates at $e$, there will be no sharp corners to protrude beyond the rounded corners $a$ of the vessel or receptacle A.

The convenience of this apparatus speaks for itself and does not require further demonstration. It may, of course, be made of various sizes to suit different conditions and requirements; it may be made small enough for the wants of a single person only, so that it can be readily carried in the pocket (including lamp, cup, spoons, and other necessary implements); or it may be large enough to serve the wants of a whole picnicking party. Again, it may be made very plain and inexpensive, from tin or galvanized sheet iron; or, if desired, it can be made highly ornamental by nickel or silver-plating, engraving, and embellishments in various ways, so as to answer the purpose of an always welcome gift to the sportsman, canoeist or tourist.

Having thus described my invention, I claim and desire to secure by Letters Patent of the United States—

The portable cooking utensil herein shown and described, comprising the flat body or vessel A having hinged top cover B′ and spout C; hinged and overlapping handle-bails D D′; hinged side-plates E and E′ having air holes $e'$ and cut off obliquely at their upper corners; and hinged end plates F and F′ having air holes $e'$ and cut off at their upper corners, and provided with hooks for connecting them to the hinged side plates; all constructed and combined substantially as and for the purpose herein shown and set forth.

In testimony that I claim the foregoing as my own I have hereunto affixed my signature in presence of two witnesses.

FRIEDRICK ELI MONTANUS.

Witnesses:
LEWIS BAGGER,
STEWART SHEA.